Aug. 1, 1950         B. F. ARPS         2,517,163
                      DUMP SCOOP
Filed Nov. 6, 1944                    2 Sheets-Sheet 1

INVENTOR.
BRUNO F. ARPS
BY A.S.Krotz
ATTORNEY

Aug. 1, 1950    B. F. ARPS    2,517,163
DUMP SCOOP

Filed Nov. 6, 1944    2 Sheets-Sheet 2

INVENTOR.
BRUNO F. ARPS
BY
A.S.Krotz
ATTORNEY

Patented Aug. 1, 1950

2,517,163

UNITED STATES PATENT OFFICE 2,517,163

DUMP SCOOP

Bruno F. Arps, New Holstein, Wis., assignor to Arps Corporation, New Holstein, Wis., a corporation of Wisconsin Application November 6, 1944, Serial No. 562,173

6 Claims. (Cl. 37—126)

The present invention relates to a dump scoop adapted to be attached to the rear end of a tractor. The tractor having preferably a hydraulic power lift with which to raise and lower the scoop.

The principal object of the present invention is to provide a scoop which is simple, light, easily manufactured at low cost, and easily attached to a tractor.

Important objects of the present invention are to provide a scoop wherein the loading or down suck of the scoop may be adjusted to accommodate various soil conditions and having means for locking the scoop in its loading and carrying position and for positively dumping the scoop.

In the present invention, applicant provides a scoop which consists of but three major units or parts which can be easily disassembled and reassembled and attached to and detached from the tractor, and convenient means for a connection to the standard power lift of the tractor.

To these and other useful ends my invention consists of parts, combinations of parts, or their equivalents, and mode of operation as described and claimed and shown in the accompanying drawings in which:

Figure 1:
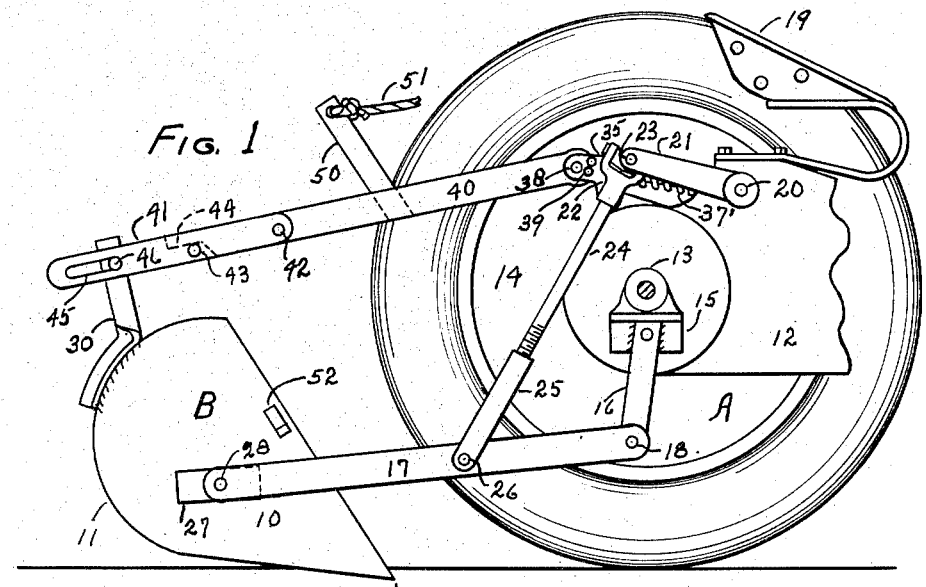
Fig. 1 is a side elevational view of my invention as attached to a conventional tractor.
Figure 2:
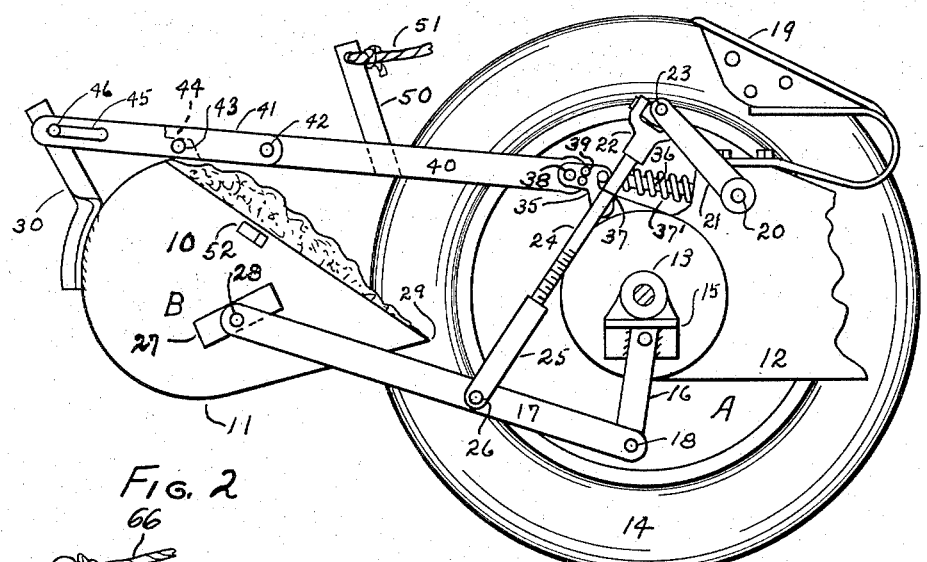
Fig. 2 is a view similar to Figure 1 with the scoop lifted.
Figure 3:
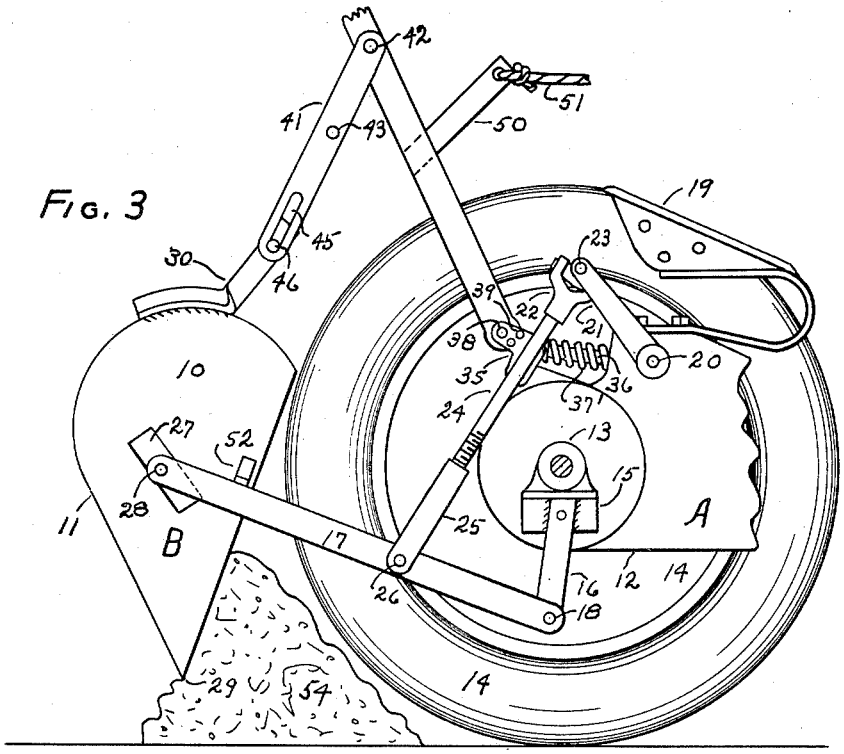
Fig. 3 is a view similar to Figures 1 and 2 except after the scoop has been dumped.
Figure 4:
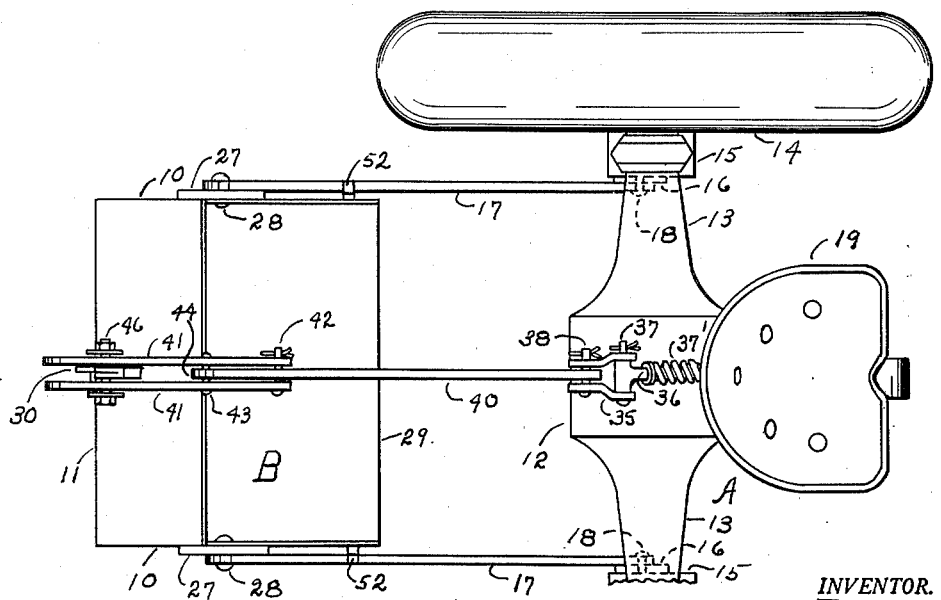
Fig. 4 is a top view of the device as shown in Figure 1.

In the figures I have designated the tractor by reference character A, and in Figures 1, 2, and 3 the near wheel is removed, the scoop element is designated by reference character B.

Member B comprises side panels 10—10 and a bottom and rear panel 11 as illustrated, forming a bucket which is light, strong, and easily manufactured at low cost.

Tractor A comprises a frame 12 and axle housings 13—13 having axles to the ends of which wheels 14—14 are secured, the wheels preferably having rubber tires. The operator's seat is designated by reference numeral 19 and is spring mounted to frame 12, as illustrated in Figures 1, 2 and 3.

Members 13 have brackets 15—15 secured thereto and about in the position as shown in the figures. Brackets 15 have depending arms 16—16 to which the forward ends of draw-bars 17—17 are pivotally secured as at 18.

A hydraulic powered lift, (mechanism not shown) is mounted preferably within tractor frame 12 having a shaft 20 which protrudes from opposite sides of member 12. On the ends of shaft 20 I mount levers 21—21 having at their rear ends preferably a universal joint 22 pivoted thereto as at 23, each universal joint having a link 24 which is screw-threaded into forked brackets 25, the forked brackets being pivotally connected to draw-bars 17 as at 26.

The power lift mechanism comprises a hydraulic pump and a valve having a lever within reach of the operator so the rear ends of members 17 may be raised and lowered at will.

On the outsides of members 10 I secure stiffening blocks 27 to which the rear ends of members 17 are pivotally secured as at 28. I prefer to position pivot 28 horizontally about as shown, so this pivot is in front of the center of gravity whereby when the power lift first acts to lift, the scoop will tilt backward because of slot 45.

Scoop B is provided with the usual reforcing cutting blade (not shown) as at 29. On the rear end of member B in about the position shown in Figures 1, 2 and 3 and transversely midway the scoop, I mount a bracket 30 in about the design shown. Clearly member 30 may be considered a bracket with which to make the pivotal connections 46 and 62 to the scoop. This bracket may be changed in length and the position and the pivotal connections to the scoop may be considered as being made on the upper rear corner of the scoop.

I provide means for holding the scoop in definite positions on pivots 28 as follows:

A bell-crank 35 is pivoted at its lower end (not shown) to member 12 having a shaft 36 which is pivoted to member 35 as at 37. The front end of shaft 36 is slidably mounted in member 12 and having a push spring 37' suitably mounted thereon, the forward end of shaft 36 having means (not shown) to limit the rearward movement thereof. The upper end of bell-crank 35 is provided with a number of holes 39 and into any one of those holes a rearwardly extending arm 40 is pivoted by means of a bolt 38. I provide a pair of links 41—41 which are pivoted to arm 40 by means of a bolt as at 42, the rear end of arm 40 being shaped as shown by dotted lines in Figures 1 and 2. A bolt 43 extends through members 41 forming a rest for projection 44 on the rear end of member 40. On the rear ends of members 41 I provide slots 45 through which a bolt 46 extends, the bolt being secured to the upper end of member 30. Thus members 40, 41 and 42 form a toggle joint which is limited in its downward movement by members 43 and 44.

When member 44 is resting on member 43, pivot 42 must be on or slightly below the plane of pivots 38 and 46. Thus when loading the scoop members 40 and 41 will act similar to a rigid bar and maintain the space between pivots 38 and 46.

I provide means for dumping the scoop as follows:

An arm 50 is secured to member 40 having a rope 51 secured to its upper end, the forward end of the rope being tied to the seat. When the operator desires to dump the scoop a pull on the rope will raise pivot 42 so members 40 and 41 will act as a toggle-joint and permit the scoop to tip to the position shown in Figure 3. It is desired to prevent the scoop from tipping further than shown in this figure and I therefore provide stops 52 on members 10 for this purpose. This stop answers two purposes viz., when it strikes member 17, the impact will jar loose any material which may stick to the scoop, and as shown in Figure 3 so it will hold the scoop in a suitable position for optionally levelling the material.

In Figure 3 I show a quantity of dirt marked 54 as having fallen from the scoop. If the tractor is moved forward the scoop will then act to spread the dirt and by raising the scoop more or less, the operator can spread the dirt at will.

Some of the advantages of applicant's toggle-joint are that it will not wear, is easily tripped and can be used manually to urge the scoop toward a dumping position and when the scoop is lowered by pushing rearwardly on lever 50 or downwardly on bar 40, the scoop can be forced to its loading position; or if the operator wishes, the tractor can be backed slightly so as to definitely move the scoop to its loading position at which time the toggle joints will assume a locked position.

It will be seen that applicant's scoop is very simple, consisting of but a few parts and that it can be easily and quickly removed from the tractor and as easily replaced by the tractor operator, that the cutting edge of the scoop can be raised ahead of the body of the scoop and that because of the position of pivots 38 and 46, the back tilted position of the scoop increases slightly as the scoop is raised and further increased by the action of pin 46 in slot 45 particularly when the weight of the material in the scoop and the scoop in rear of pivot 28 tend to tip the scoop rearwardly.

Furthermore because of the shape of the bottom and rear of the scoop when it is resting on the ground, it can be tilted backward slidably because of slot 45, by backing the tractor thus to raise the cutting edge 29. There are times when loading a scoop that this feature is valuable for obvious reasons.

Figure 5:
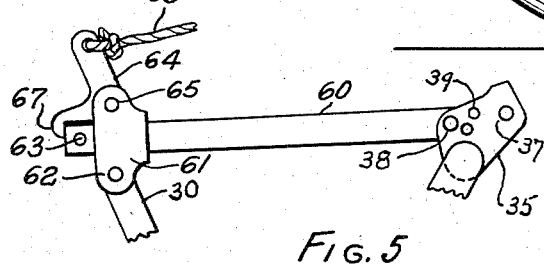
Fig. 5 is a view of a modification.

It will be understood that the toggle-joint mechanism is preferred and therefore shown, however I may elect to use the design shown in Figure 5 of a copending application, Ser. No. 554,657 filed September 18, 1944, Patent No. 2,398,991 issued April 23, 1946, wherein a link 60 is pivoted at its front end to member 35 as at 38. A block 61 is slidably mounted on member 60 and pivotally connected to member 30 as at 62. Near the rear end of member 60 I provide a stop pin 63 which limits the rearward movement of block 61. A bell crank 64 is pivoted to member 61 as at 65, the upper end having a rope 66 which extends to within reach of the operator. Bell crank 64 at its other end is provided with a hook 67 adapted to engage the end of member 60 when the scoop is being loaded and lifted for transportation. It will be understood that members 64 and 67 may be largely in rear of pivot 65 and having a stop (not shown) whereby hook 67 will be engaged by gravity or a spring (not shown) may be used as in the copending application aforementioned. It will also be seen that spring 37' will hold cutting edge 29 in its normal position but that when loading, if a serious obstruction is met, cutting edge 29 may yield slightly so as to protect the device from injury.

Clearly many minor detailed changes may be made in the designs shown without departing from the spirit and scope of the appended claims.

Having thus shown and described my invention I claim:

1. In combination with a tractor having a power lift, a scoop body, drawbars pivotally attached at their front ends to the tractor and at their rear ends to the side panels of the scoop, an elongated toggle joint spaced a distance above the transverse plane of said drawbars and being pivoted at its forward end to the tractor, and at its rear end to the upper rear corner of the scoop, means on the toggle joint adapted to limit the downward movement of its pivot to its extreme extended position, manually controlled means whereby the pivot of the toggle joint may be raised thereby to assist and permit the scoop to tilt forward and dump its load, said power lift having an operating connection to the drawbars for raising and lowering the scoop.

2. A device as recited in claim 1, stopping means on said scoop adapted to contact the drawbars when the scoop is in a predetermined dumped position.

3. A device as recited in claim 1 including, said rear pivotal connection to said toggle joint having a free rearward movement for a distance whereby the first movement of the power lift will lift only the forward end of the scoop to thereby tilt the scoop rearwardly and then hold the scoop in its rearward tilted position until the scoop is released for dumping its load.

4. A device as recited in claim 1 including, a stop secured to a side panel of said scoop and a distance from the pivot of the adjacent draw bar to the scoop side panel and positioned, whereby the limit dumped position of the scoop is determined.

5. A device as recited in claim 1 wherein the pivotal connection to the scoop at the rear end of the toggle joint is of the pin and slot type adapted to permit the scoop to tilt backwards a limited amount when the rear end of said draw bars are first raised to thereby tilt the scoop backwards slightly before being lifted from the ground by the draw bars.

6. In combination with a tractor having a power lift, a scoop body having side panels, transversely spaced draw bars pivotally attached at their front ends to the tractor and at their rear ends to said side panels intermediate the ends thereof, a bar spaced at both ends a distance above said draw bars and being pivoted at its forward end to the tractor and at its rear end to the upper rear corner of the scoop, means on said bar for holding the scoop in a loading position, other means on said bar for releasing the scoop for dumping its load, the pivotal connection of said scoop to the rear end of the bar being adapted to permit the scoop to tilt rearwardly slightly as the scoop is first lifted from the ground by said draw bars.

BRUNO F. ARPS.

REFERENCES CITED

The following references are of record in the file of this patent:

UNITED STATES PATENTS

| Number | Name | Date |
|---|---|---|
| 2,295,850 | King | Sept. 15, 1942 |
| 2,352,466 | Arps | June 27, 1944 |